United States Patent Office 2,737,450
Patented Mar. 6, 1956

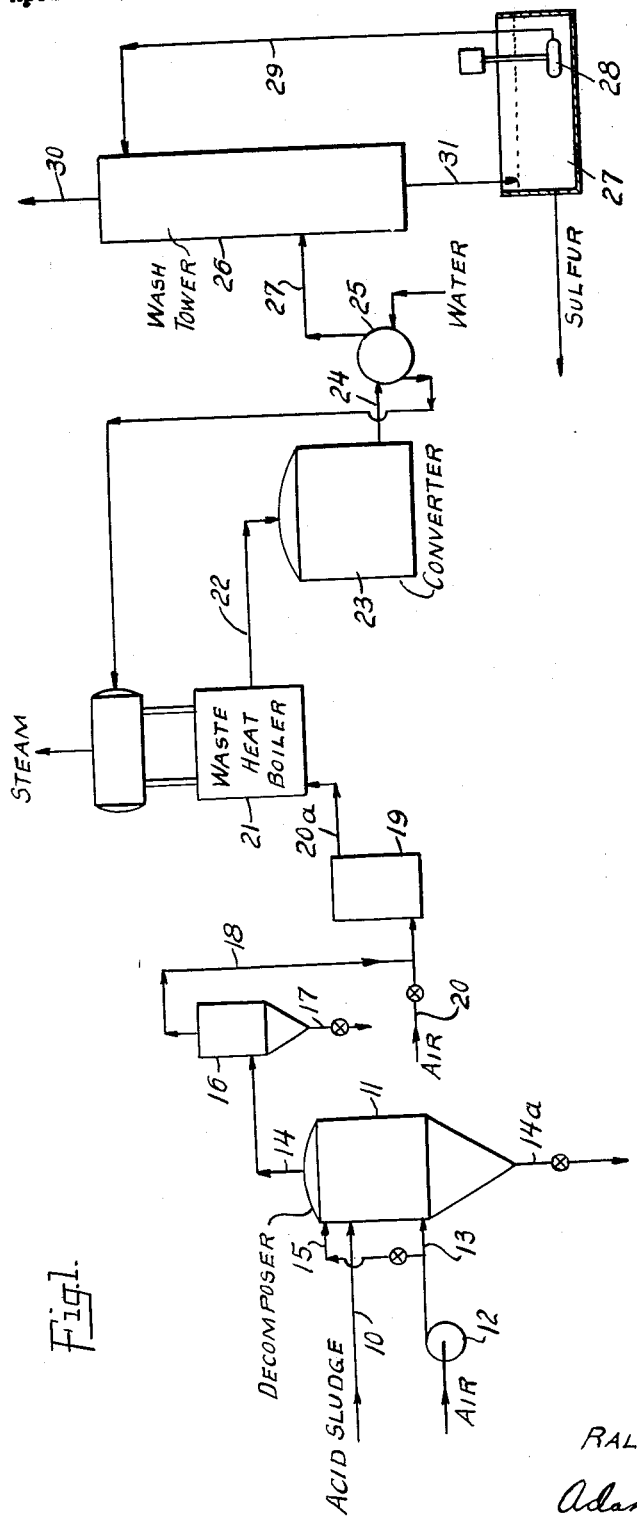

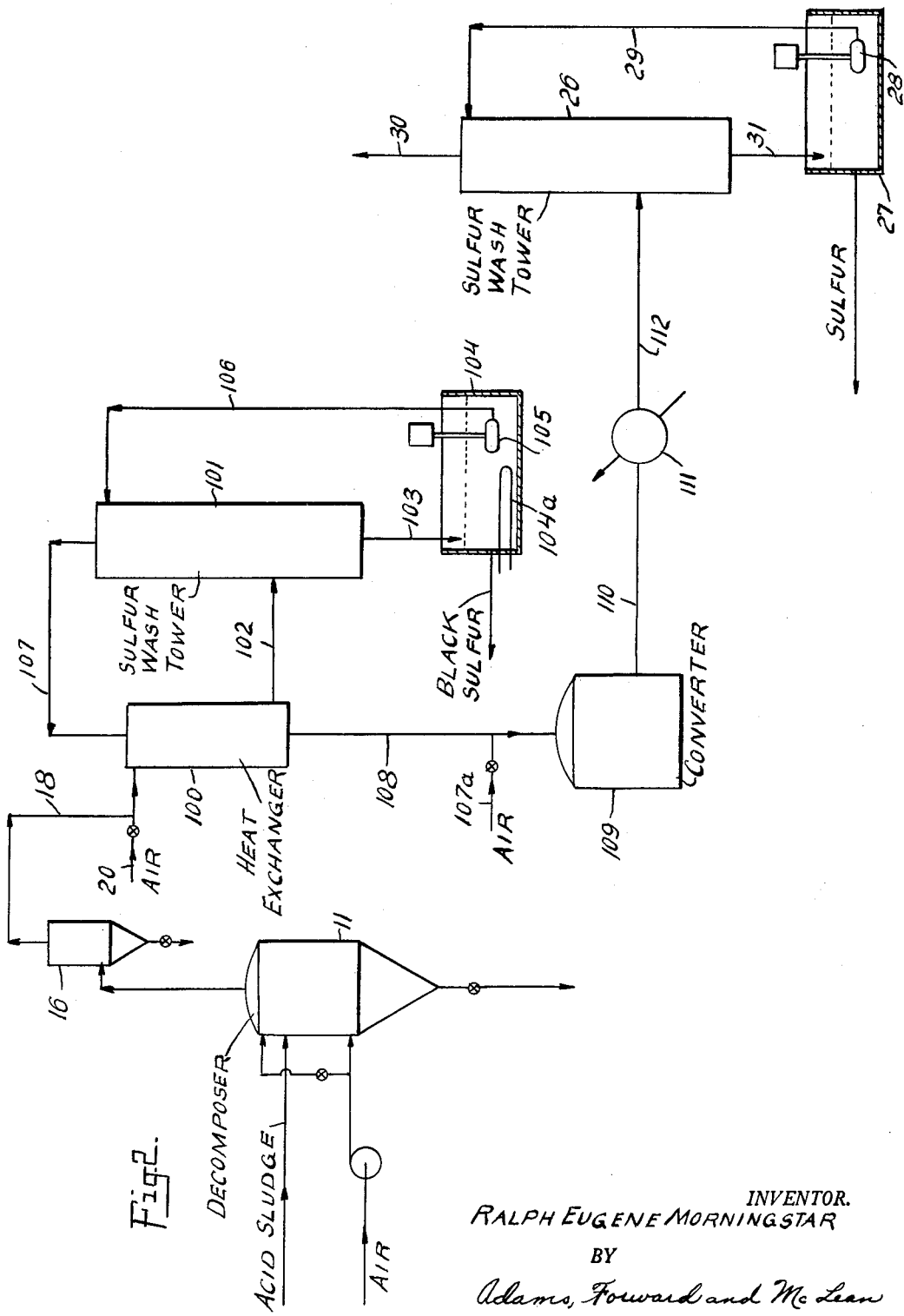

2,737,450

RECOVERY OF SULFUR FROM WASTE HYDROCARBON-CONTAINING SULFURIC ACID

Ralph Eugene Morningstar, Columbus, Ohio, assignor, by mesne assignments, to The Fluor Corporation, Ltd., a corporation of California Application April 25, 1951, Serial No. 222,897

1 Claim. (Cl. 23—224)

My invention relates to the recovery of the sulfur values of waste sulfuric acid sludges in the form of elemental sulfur. More particularly, it relates to improvements in the recovery of sulfur from hydrocarbon-containing waste sulfuric acid and sulfuric acid sludges by thermal decomposition of the waste acid to a hydrogen sulfide containing gas stream which is then converted in a series of reactions to elemental sulfur.

Considerable progress has been made in the economic recovery of sulfur from waste sulfuric acids, particularly in the form of sludge, sludge acid or acid sludge and spent alkylation acid as produced by the petroleum industries. The waste acid is thermally decomposed in a reaction vessel in contact with a body of hot coke. It has been necessary, however, to control the decomposition to produce sulfur dioxide as the primary sulfur gas product and then partially reduce the sulfur dioxide in a separate high temperature combustion process to a mixture of hydrogen sulfide and sulfur dioxide which is converted advantageously catalytically, to elemental sulfur by known means. The decomposition reaction is conducted under temperature conditions providing exit gas temperatures of about 500° to 1000° F. The temperature is controlled by the amount of air introduced to the bottom of the coke bed. The partial reduction reaction on the other hand requires a temperature of about 1700° to 2200° F. This temperature has been obtained by reaction of residual hydrocarbons and carbon monoxide in the charge with air and with the sulfur dioxide.

It has been thought necessary to conduct this operation in a separate large volume combustion chamber, first because of the volume of air required to obtain the high temperature level by combustion and secondly because the high heat of reaction was dependent on a combustion flame reaction. The rate at which the combustion mixture could be introduced to the combustion zone was dependent upon and limited by the rate of flame propagation. The relatively slow rate of the latter required a large volume combustion space. My invention however provides a means for effecting the decomposition in a single reaction vessel in a manner producing directly a gas stream containing a ratio of 2 or more moles of hydrogen sulfide per mole of sulfur dioxide. I have found that it is not necessary to depend on a subsequent oxidation-reduction reaction to heat the gases to the reaction temperatures necessary to obtain the desired partial reduction but that, in the presence of hydrocarbons vaporizing from the charge, simple admixture of hot combustion products driven from the body of coke at high temperature with the decomposition gases can be controlled to effect the desired partial reduction of the sulfur dioxide in the decomposer.

My invention therefore permits elimination of the large and expensive separate combustion furnace for partial reduction of the sulfur dioxide rich exit gas stream from the decomposing unit. It also permits the elimination of intermediate adjustment of hydrocarbon content to a level desirable for the partial reduction reaction by scrubbing out excess hydrocarbons and elimination of a necessary concomitant cooling step. Hence, it provides important advantages in the way of savings in capital investment and heat economies in operation. Moreover, the operation is accompanied by a lower over-all air requirement per unit of sludge charged. Therefore a richer gas is produced which improves conversion and sulfur recovery and is an important factor in reducing equipment requirements.

According to my invention, a hydrocarbon-containing waste sulfuric acid material such as an acid sludge or spent alkylation acid is decomposed in contact with a body of hot coke maintained in a reaction vessel. The waste acid is charged to the body of hot coke and the decomposition gases are withdrawn from an upper portion of the reaction vessel. An exit gas temperature of 1200° to 1500° F. is maintained by introduction of air to the body of coke. The hydrocarbon content of the waste acid feed vaporizes and is cracked or partially burned in the upper part of the reaction vessel above the body of hot coke where the decomposition reaction occurs. A ratio of hydrogen sulfide to sulfur dioxide in the exit gas stream of at least 2:1 is maintained by adjusting the extent of hydrocarbon reaction occuring above the coke body. The ratio then may be adjusted as desired to 2:1 before subjecting the gas stream to the sulfur conversion reaction. The exit gas stream advantageously is treated to remove residual soot or other carbonaceous matter as by passing the decomposition gases through one or more cyclone separators, preferably followed by passage through a hot gas filter or a scrubber for final clean up. The temperature of the decomposition gas stream is adjusted and the reaction process is completed by passing the sulfur bearing gases through a catalytic converter for conversion to elemental sulfur. Advantageously, the temperature of the gas stream is adjusted to about 450° to 750° F., and advantageously the sensible heat removed is recovered by generation of steam in a waste heat boiler system.

The conversion reaction may be effected in a single stage converter, advantageously employing an activated bauxite catalyst, or in a multi-stage conversion operation. Where two-stage conversion is employed to improve sulfur recovery, the temperature of the gas stream following the first conversion stage is adjusted to about 450° to 550° F. before the second conversion stage. Following the conversion operation, the elemental sulfur produced is condensed and separated from the residual gases and vapors.

The process of my invention will be better understood by reference to the accompanying drawings which illustrate in Figure 1 a simplified flow plan of the basic process and in Figure 2 another method of handling the decomposer effluent gases. In Figure 1 the waste acid feed is charged through line 10 to the decomposer 11 in which a body of hot incandescent coke is maintained in the form of a bed. Air or other oxygen containing gas is introduced by means of blower 12 and connection 13 below the coke bed at a rate designed to obtain the desired temperature in the exit gas stream withdrawn overhead through line 14. Excess coke may be withdrawn through a hopper or grate system indicated by line 14a. Hydrocarbons contained in the waste acid feed vaporize in the upper portion of the decomposer 11 above the surface of the coke bed and are cracked or partially burned with excess air. Secondary air in amounts varying up to about 50 per cent of the total air may be introduced to the space above the bed in upper portion of the decomposer through connection 15. In this way excess hydrocarbons in the feed may be burned to obtain heat and to crack sufficient of the hydrocarbons to reduce the desired proportion of sulfur dioxide in the decomposition gases arising from the coke bed to hydrogen sulfide.

The exit gas stream through line 14 is cleaned up by removal of soot and coke particles in cyclone separator 16. Separated coke is drawn off through connection 17 and the decomposition gas stream is passed by means of line 18 to filter 19, which advantageously comprises a metal vessel packed with a porous refractory material in particle form, where carbon fines are filtered from the gas stream. At this point, the ratio of hydrogen sulfide to sulfur dioxide in the gas stream advantageously is adjusted by adding additional air through connection 20. A slight excess of air will serve to keep the filter clean at the high temperatures involved by burning off the carbon deposited. The gas stream from the filter 19 is passed through line 20a through waste heat boiler 21 and thence through connection 22 to catalytic converter 23. A bed of a catalyst for conversion of hydrogen sulfide and sulfur dioxide to elemental sulfur such as activated bauxite is maintained in converter 23. The gas stream withdrawn from converter 23 is passed by means of connection 24 through economizer 25 where boiler feed water for waste heat boiler 21 is preheated in the flow plan illustrated. The gas stream with the sulfur formed in the vapor state then is introduced into a lower portion of sulfur wash tower 26 by line 27. The elemental sulfur product is condensed in the tower 26 by countercurrent contact with liquid sulfur pumped to the top of the tower from sump 27 by pump 28 through line 29. Residual gases and vapors pass overhead to the stack through line 30 and condensed sulfur plus the recycling sulfur wash liquid are returned to the sump 27 as by line 31. The sump may be an integral part of the tower or may represent a separate receiver. The net sulfur make may be continuously or intermittently withdrawn from the recycle sump to storage as solid sulfur. The efficiency of the scrubbing operation depends upon keeping the temperature of the liquid sulfur introduced to the top of the tower 26 as low as possible and cooling coils may be provided in the tower or in the sump 27 for temperature control.

Another method of handling the exit gas stream from decomposer 11 is illustrated in Figure 2. Coke breeze is separated as before in cyclone 16 and the hydrogen sulfide-sulfur dioxide ratio of the gas stream in line 18 is adjusted as required by the addition of air through connection 20. Before catalytic conversion, the gas stream is further treated to remove fine soot and carbonaceous matter carried over from the decomposition reaction and not removed in the cyclone separation system by passing the gas stream through a sulfur scrubbing tower. First the temperature of the gas stream is adjusted by passing the gases through gas-to-gas heat exchanger 100. Temperature of the gas stream is reduced to about 450° to 750° F. by indirect exchange with the effluent gas stream from sulfur wash tower 101. The cooled gas stream from heat exchanger 100 is introduced by connection 102 to sulfur wash tower 101 in its lower section. In the tower 101, the gas stream is scrubbed by countercurrent contact with liquid sulfur circulated from the bottom of tower 101 through line 103, sump 104, pump 105 and line 106 to the top section of the tower 101. Cooling coils 104a may be provided in sump 104. Some sulfur produced in the decomposition reaction is condensed in the tower 101. The effluent gas stream from wash tower 101 is passed through line 107 through gas-to-gas heat exchanger 100 and through line 108 to converter 109. Connection 107a provides alternate means for adjusting the hydrogen sulfide-sulfur dioxide ratio. From the converter 109, the conversion gas stream is passed as before through connection 110, cooler 111 and connection 112 to sulfur wash tower 26 in which sulfur produced in converter 109 is recovered in the manner described above.

This operation has the advantage of protecting catalyst in converter 109 in a highly efficient manner avoiding the use of a filter chamber. Yields are improved somewhat by removing any residual hydrocarbons carried over from decomposer 11. The sulfur produced in wash tower 101 is black due to the carbonaceous matter scrubbed out of the decomposition gas stream, but black sulfur has a good market in the agricultural field and can be used as such without harmful effect in sulfur burning for sulfuric acid production or can be filtered to remove the carbonaceous matter. The operation shown can be modified, if desired, to incorporate a waste heat boiler in conjunction with the gas-to-gas heat exchanger 100 illustrated to improve the cooling process and recover valuable waste heat. Also the catalytic conversion operation can be conducted in two or more stages rather than the single stage illustrated.

The waste acid charge preferably comprises a blend of acid sludge from lubricating oil refining operations and alkylate acid. Proportions depend on the nature of each and on other factors discussed below but the blend usually has about the viscosity of heavy mineral oil. The blend is conveniently prepared by mixing at about 135° F., although temperatures up to about 190° F., may be used. Higher temperatures cause corrosion and unnecessary loss of sulfur dioxide due to partial decomposition of the sludge, and stiffening of the sludge. The charge is advantageously kept agitated, for example, by recirculating to and from the blending tank or tanks. The charge is conveniently pumped from the blending tank to a feed tank also suitably equipped to agitate the contents thereof and then by a feed pump to the decomposer.

When acid sludge is the only sulfur-bearing material available as a charge stock and it is undesirably viscous, it may be blended with relatively less viscous petroleum or other oils, wastes or residues to a convenient viscosity for charging. It also can be cut with sulfuric acid but this is usually economically undesirable. When waste alkylate acid is the only sulfur-bearing material available as a charge stock it is advantageous to blend it with relatively more or less viscous petroleum or other oils, wastes or residues to adjust the viscosity to a convenient value for handling, to provide combustible material for the decomposition, for heat, and to maintain a suitable coke bed in the decomposing unit. Suitable materials for this purpose include residues from the solvent extraction of petroleum oils, residues from cracking operations, still bottoms and the like.

The decomposer may comprise a kiln similar to that described in co-pending application, Serial No. 14,173, filed March 11, 1948, now abandoned, of Lyle K. Herndon or other suitable device for converting the sulfur values into sulfur dioxide at high temperature in the presence of a body of hot coke. In the particular kiln referred to, a bed of incandescent coke is maintained on a grate and a water cooled stirring rake is provided just below the surface of the bed. A coke bed having a minimum thickness of about 12 to 18 inches or more, although preferably about 12 to 14 inches thick is maintained in the decomposer. The coke bed is built up when necessary by increasing the proportion of sludge in the charge stock and reduced in thickness by increasing the proportion of alkylate acid. Alternatively sulfur-free tars and extracts are used to build the bed either by blending with the charge or by separate introduction. The bed may be increased in thickness by as much as 2″ per hour in this way. There is usually little difficulty in maintaining a coke bed of adequate thickness. In general, an excess of coke is produced and suitable provision is made in the equipment for the removal of excess coke. If necessary, carbonaceous material may be added in the form of coke, hydrocarbon oils, residues, extracts or the like when a thin sludge or alkylation acid, low in carbonaceous material and high in acid, is being decomposed.

Sufficient air is introduced below the coke bed to provide exit gas temperature of about 1200° to 1500° F. The decomposer is operated at these temperatures in order to decompose the oil portion primarily by cracking to carbon and hydrogen. Preferably no hydrocarbon components are present in the effluent gas. When necessary secondary air is introduced above the coke bed in order to complete the oxidation of the oil. As much as 50% of the total air introduced may be as secondary air but is usually considerably less and may be in some cases wholly unnecessary, depending largely on the oil content of the sludge charged.

The sulfur-bearing products in the exit gas from the decomposer comprise largely hydrogen sulfide and sulfur dioxide with minor amounts of elemental sulfur and carbonyl sulfide. With proper operation it is possible to produce as much as 75 mole per cent or more of the sulfur content of the charge as hydrogen sulfide in the gas. The proportion of sulfur-bearing products in the gas depends largely on the relative amounts of hydrogen sulfide and sulfur dioxide formed by the reactions:

$$SO_2 + CH_2(\text{hydrocarbons}) \rightarrow CO_2 + H_2S$$

and $$H_2S + 3/2 O_2 \rightarrow SO_2 + H_2O$$

The proportion of components is determined by the temperature, by the ratio of oil to air; the former supplying hydrogen for the formation of hydrogen sulfide, the latter oxygen for the formation of sulfur dioxide, and by the proportion of air introduced above and below the coke bed; the former supplying oxygen to oxidize the hydrocarbons, the latter forming $CO_2$ and heat. The composition of the effluent gas is also affected by the degree to which equilibrium is approached and the rate at which it is approached. Thus, the contact time in the reaction zone may be shorter than required for the establishment of equilibrium conditions depending primarily on equipment size and design, requiring control of feed rate. By appropriate control of these factors of air, oil content and feed rate, the temperature; proportion of sulfur, sulfur dioxide and hydrogen sulfide and also the oil and soot content of the effluent gas may be controlled.

In starting the preferred kiln of co-pending Serial No. 14,173, the grate is advantageously covered with a protective layer of 1 to 2 inches of crushed firebrick or other suitable refractory of such a size that it will be retained on the grate. Petroleum coke or coal coke is introduced to form a bed which may be somewhat thicker than optimum under operating conditions. The bed is ignited and burned by an air stream until it reaches operating temperatures and is of suitable thickness. By the addition of further amounts of coke, petroleum residues or the like, the bed is maintained in condition until it is desired to begin charging the sulfur-bearing materials to the decomposer. The charge is delivered onto the surface of the coke bed through one or more feed lines extending into the kiln. Optionally the feed lines may be insulated inside the kiln but this is ordinarily unnecessary with proper operation. Unless there is a stoppage of the flow of feed, the latter is thus conveniently preheated and any gases evolved are delivered along with the main part of the gas to the later part of the process. It is advantageous to clean out the feed line inside the kiln immediately after any stoppage of the feed.

The viscosity of the charge should not be so low or the feed rate so high that unburned charge penetrates the coke bed below the rake. This avoids the formation of a large cake and interference with the uniform distribution of air and hence the temperature of the bed.

The kiln is provided with means such as a screw conveyor for removing excess coke. For example, coke which has burned to a small size may fall through the grate or excess coke may be raked into vertical tubes through the grates. The coke may be removed intermittently or continuously by means of the screw conveyor to a cooling or quenching chamber.

In the decomposer, the charge is substantially completely decomposed. The exit gas contains hydrogen sulfide and sulfur dioxide in the molar proportions of at least 2:1, some elemental sulfur, major proportions of carbon oxides, nitrogen and water as well as minor proportions of coke breeze or fines and substantially no oil vapors.

The gas is cleaned, cooled and passed directly to a converter where sulfur is formed from the contained hydrogen sulfide and sulfur dioxide. As much of the coke breeze as possible is removed from the hot gas and for this purpose a centrifugal separator is useful. The coke breeze from the gas stream may be added to the sludge blend and fed to the decomposer or it may be disposed of in any convenient manner.

To remove any residual soot, the gases are passed through a hot gas filter packed with any inert material of suitable size. The quantity of carbon in the gas stream leaving the centrifugal separator is small and the soot collected in the filter is rapidly oxidized by excess oxygen or carbon dioxide in the inlet gas to carbon monoxide thus cleaning the filter. As described in connection with the drawings, a sulfur scrubbing tower may be employed prior to the catalytic converter to clean-up the gas stream and remove any sulfur produced in the decomposer.

The gas may be cooled by any suitable means, for example, by passage through a water-cooled tubular heat exchanger, waste heat boiler or a gas-to-gas heat exchanger before the converter. For this purpose, the gas leaving the filter may be passed through one side of a water-cooled heat exchanger.

At this point just ahead of the hot gas filter it is particularly convenient to introduce additional air to adjust the $H_2S:SO_2$ ratio in the gas. This adjustment may, however, be made at any point before the converter. While the decomposer may be operated to produce directly a gas containing $H_2S:SO_2$ in the ratio of 2:1 it is preferable to produce an excess of $H_2S$ and adjust it later by admixing air with the gas. So much air is added that some of the excess $H_2S$ is oxidized to $SO_2$:

$$2H_2S + 3O_2 \rightarrow H_2O + 2SO_2$$

and the $H_2S:SO_2$ ratio is thus adjusted to approximately 2:1. Simultaneously, if necessary, air to clean the hot gas filter may also be added to the gas stream.

To avoid clogging the converter, the gas must not be cooled below about 450° to 475° F., the dew-point with respect to sulfur. It is particularly advantageous to use multi-stage conversion with two or more converters in series or a double-bed converter, operating the first bed at about 670° to 750° F. This insures hydrolysis of any carbonyl sulfide in the gas even though the temperature is too high to convert a major portion of the hydrogen sulfide and sulfur dioxide to sulfur. The second bed or converter is operated at about 500° F. This temperature is easily maintained within 10° F. and is more favorable to the conversion to sulfur. The temperature is reduced between stages of heat transfer, suitably in an economizer operated in conjunction with a waste-heat boiler following the hot gas filter.

The sulfur-bearing gas is passed from the converters to a scrubbing tower to remove the sulfur. The scrubbing liquid is advantageously liquid sulfur which is pumped from a sump, where its temperature is appropriately maintained at about 250° to 270° F., to the top of the tower and sprayed thereinto. The tower alternatively may be of the baffled type, for example, as described in U. S. Patent No. 2,386,202. Sulfur is removed intermittently or continuously from the sump to storage or use and gas from the scrubber is vented to the atmosphere directly or through a heat exchanger against the sulfur-bearing gas. With proper operation, the waste gas contains only traces of sulfur or sulfur compounds.

Although a sulfur scrubbing tower may be used after the gas is cleaned and cooled and before it enters the converter when large proportions of elemental sulfur are present in the gas from the decomposer, it is a surprising feature of this invention that even though considerable sulfur is present in the gas before it enters the converter, the conversion is nearly complete, no retarding effect on the formation of sulfur by the preformed sulfur being observed.

The following examples are illustrative of typical operating conditions:

Example I

Sludge was fed at the rate of about 300 pounds per hour to a decomposer such as described in Serial No. 14,173. The coke bed was maintained at a thickness of about 12 inches and the gas temperature was about 1490° F. Primary air was blown into the decomposer below the coke bed at 149 cubic feet per minute at standard temperature and pressure. No secondary air above the coke was required. The exit gas from the decomposer contained 1.16 moles per hour of hydrogen sulfide, 0.34 mole per hour of carbonyl sulfide, 0.17 mole per hour of sulfur dioxide, about 1% of hydrocarbons, balance largely nitrogen, carbon dioxide and water. This represents a very satisfactory gas for dilution with additional air and charging to the converter.

Example II

Charging sludge at the rate of 884 pounds per hour and air at 1060 pounds per hour to the same decomposer, maintaining the coke bed at about 12 inches thickness and the temperature in the reacting gases just above the coke bed at about 1500° F., a gas was produced containing 3.00 moles per hour of hydrogen sulfide, 0.96 mole per hour of carbonyl sulfide and 0.59 mole per hour of sulfur dioxide, balance principally nitrogen, carbon dioxide and water.

This gas is admixed with a suitable proportion of air to convert part of the hydrogen sulfide to sulfur dioxide, resulting in a ratio of hydrogen sulfide to sulfur dioxide of 2:1. It is filtered through a hot gas filter, cooled and passed through the first bed of a bauxite-packed converter 700–750° F. The exit gas is further cooled and passed through the second bed at about 500° F. Sulfur scrubbed from the resulting gas amounts to about 3.96 moles per hour (85% recovery).

In contrast to prior practice in the recovery of sulfur from sludge, the present porcess eliminates the necessity for a separate furnace and process step for the conversion of part of the sulfur dioxide resulting from the sludge decomposition into hydrogen sulfide by effecting the decomposition of the sludge and reduction of a major proportion of the sulfur dioxide in one operation and in one piece of equipment. It was not hitherto thought possible that these steps could be combined because of the different conditions under which the two steps have been carried out. While not being bound by any theories of the reactions or mechanisms involved, it is believed that possibly the conditions of operation as defined above cause cracking of heavy hydrocarbon molecules to fragments which act as the reducing agent for sulfur dioxide to hydrogen sulfide and sulfur.

Moreover, an oil scrubber for the effluent gases from the decomposer was necessary to remove excess oil vapor in order to control the reduction of sulfur dioxide to hydrogen sulfide in the previous partial combustion furnace. The scrubber as well as the partial combustion furnace is now eliminated by the cracking in the decomposer of the hydrocarbon components of the gas and by the reduction in the decomposer. Heat losses formerly sustained in the scrubber are also avoided. In the present process any desired proportions of air (primary and secondary) may be introduced into the decomposer without danger of blowing out the fire. Such difficulties have hitherto been encountered in the operation of the partial combustion furnace. Ample heat is obtained initially in the present process by blasting the coke bed with air. Because heat losses in the scrubber are eliminated, less total air is used, the product is less diluted by nitrogen, carbon dioxide and water, the recovery is improved and equipment costs are materially reduced.

I claim:

In the recovery of sulfur from waste hydrocarbon-containing sulfuric acid by decomposition in contact with a body of hot coke maintained in a reaction vessel, the method which comprises charging waste acid to the body of hot coke to decompose the acid and produce a gaseous mixture in the upper portion of the reaction vessel comprising combustion products from the coke and decomposition gases including hydrocarbons, withdrawing a gas stream from an upper portion of the reaction vessel, maintaining an exit gas temperature of 1200° to 1500° F. by introduction of air to the body of coke, adding secondary air in an amount up to 50 per cent of the total air to the mixture of vaporizing hydrocarbons and decomposition gases in the upper portion of the reaction vessel, maintaining a molar ratio of hydrogen sulfide to sulfur dioxide in the exit gases of greater than 2 to 1 by controlling the extent of hydrocarbon cracking and burning in admixture with the decomposition gases in the upper portion of the reaction vessel, removing carbonaceous matter from the decomposition gas stream, adjusting the ratio of hydrogen sulfide to sulfur dioxide in the gas stream to 2 to 1 by the addition of air to the decomposition gas stream, cooling the gas stream to about 450° to 750° F., catalytically converting the sulfur gases in the gas stream to elemental sulfur and separating sulfur from residual gases and vapors.

References Cited in the file of this patent

UNITED STATES PATENTS

| Re. 19,531 | Benner et al. | Apr. 16, 1935 |
| 1,014,520 | Robinson | Jan. 9, 1912 |
| 1,031,413 | Black et al. | July 2, 1912 |
| 1,057,395 | Robinson | Mar. 25, 1913 |
| 1,741,551 | Benner et al. | Dec. 31, 1929 |
| 1,917,685 | Bacon | July 11, 1933 |
| 1,936,809 | Tyrer | Nov. 28, 1933 |
| 1,953,225 | Hechenbleikner | Apr. 3, 1934 |
| 2,028,725 | Rumple | Jan. 21, 1936 |
| 2,049,243 | Bartholomew | July 28, 1936 |
| 2,074,061 | Mullen | Mar. 16, 1937 |
| 2,110,267 | Harrington et al. | Mar. 8, 1938 |
| 2,148,258 | Carter | Feb. 21, 1939 |
| 2,208,247 | Carter | July 16, 1940 |
| 2,412,667 | Arveson | Dec. 17, 1946 |
| 2,631,087 | Herndon | Mar. 10, 1953 |